UNITED STATES PATENT OFFICE.

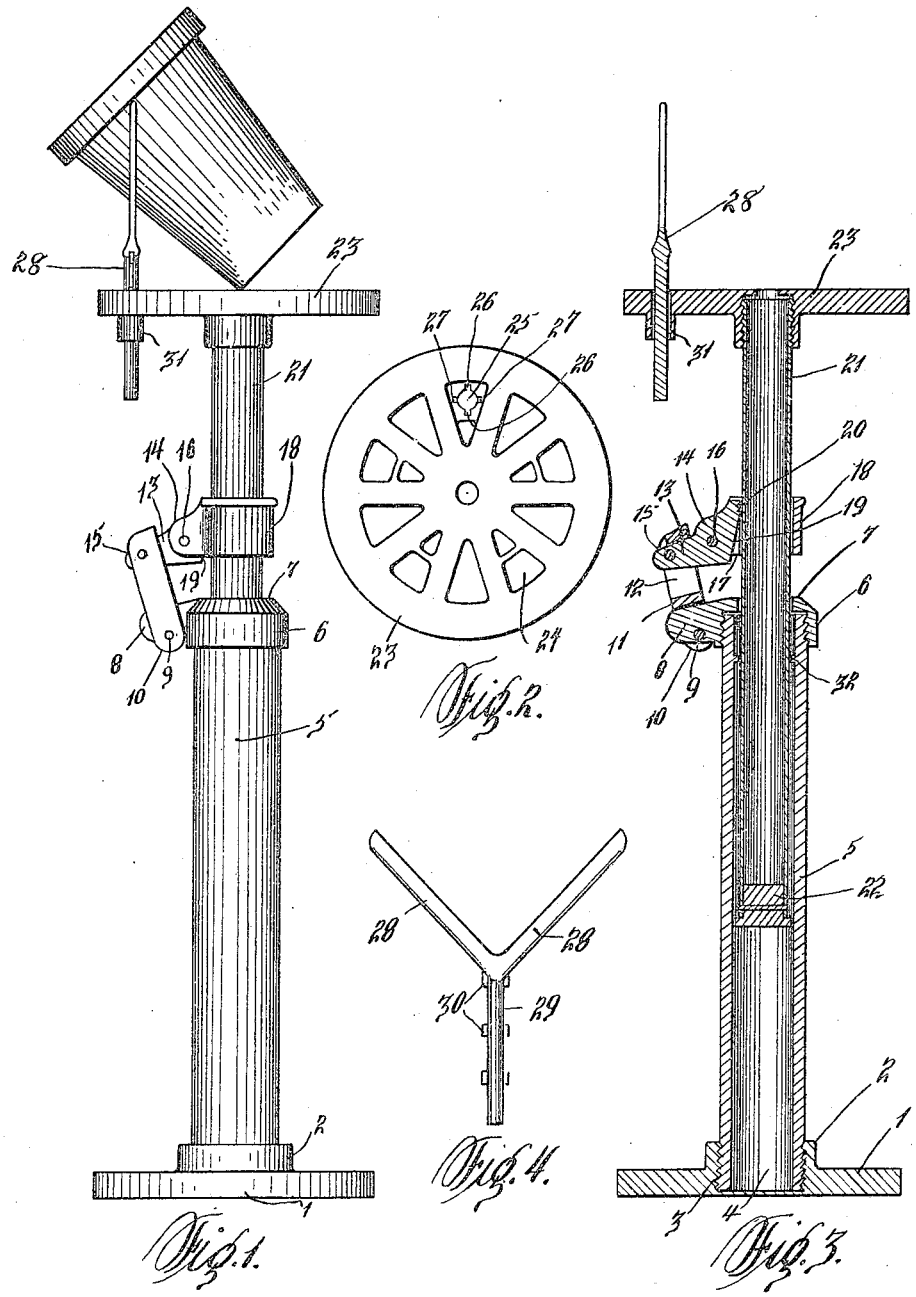

JACOB M. HAMM, OF PITTSBURG, PENNSYLVANIA.

ADJUSTABLE PLANT-STAND.

949,535.  Specification of Letters Patent.  Patented Feb. 15, 1910.

Application filed October 7, 1909. Serial No. 521,556.

*To all whom it may concern:*

Be it known that I, JACOB M. HAMM, a citizen of the United States of America, residing at East End, Pittsburg, in the county of Allegheny and State of Pennsylvania, have invented certain new and useful Improvements in Adjustable Plant-Stands, of which the following is a specification, reference being had therein to the accompanying drawing.

This invention relates to an automatic adjustable plant stand designed for supporting flower pots either in a vertical or inclined position.

The primary object of my invention is to provide an artistic and substantial stand that can be easily adjusted to support flowers or plants at a desired elevation or inclination.

Another object of the invention is to provide a flower stand that can be advantageously used by florists in decorating and arranging plants, particularly where it is desired to bank the same, whereby each and every plant will blend its color and beauty to produce beautiful and artistic effects.

A further object of the invention is to provide a strong and durable adjustable stand consisting of comparatively few parts easily assembled.

These objects and others which will hereinafter appear, I attain by means of the construction illustrated in preferred form in the accompanying drawing, wherein:—

Figure 1 is a side elevation of the stand, Fig. 2 is a plan of a detachable platform or head adapted to form part of the stand, Fig. 3 is a vertical sectional view of the stand, and Fig. 4 is an elevation of a detachable fork adapted to form part of the stand.

In the drawing 1 denotes a circular base provided with a central enlargement 2 having an interiorly screw threaded socket 3 for the lower threaded end 4 of a tubular pedestal 5.

6 denotes a cap detachably mounted upon the upper end of said pedestal, said cap having a central opening 7 and a radially disposed lug 8. Pivotally connected to the lug 8 by a pin 9 is the bifurcated end 10 of a link 11, the upper end of said link being slotted, as at 12 to receive the end 13 of a dog 14, the end 13 of said dog being pivotally mounted in the link 11 by a pin 15. The dog 14 is pivotally mounted by a pin 16 in the slot or slit 17 of a collar 18, and the end of said dog is beveled, as at 19 and toothed or serrated, as at 20 for purposes that will hereinafter appear.

21 denotes a stand pipe or post having the lower end thereof provided with a head 22, while the upper end thereof is provided with a detachable circular head or platform 23. The platform 23 is provided with openings or perforations 24 to reduce the weight of the same and save material, also with a specially designed vertical opening 25 having the opposite walls thereof provided with grooves 26 and the material bordering upon the upper end of the opening with diametrically opposed notches 27, said notches being arranged at right angles to the grooves 26.

28 denotes a Y-shaped fork having the vertical shank 29 thereof provided with three sets of diametrically opposed lugs 30. The shank 29 of the fork is adapted to extend into the opening 25 of the platform 23 and be supported in either of three positions by the lugs 30 engaging in the diametrically opposed notches 27. To steady the shank 29 within the opening 25 and prevent the same from wabbling, the platform 23 is provided with a depending sleeve 31 and alining with the opening 25, said sleeve having the walls provided with grooves alining with the grooves 26.

The stand pipe or post 21 is adapted to extend through the collar 18 into the pedestal 5, and said pedestal adjacent to the upper end thereof is provided with an annular inwardly projecting flange 32 adapted to be engaged by the head 22 for preventing the stand pipe or post from being accidentally withdrawn from the pedestal. The dog 14 and the collar 18 constitute a clutch for frictionally gripping the stand pipe or post 21 and hold the same in an adjusted position.

The fork 28 is used to support a flower pot at an inclination, as is best shown in Fig. 1, and said fork can be removed when it is desired to place a board or plank (not shown) on two or more stands to support a large number of plants.

The stand is made of iron and can be painted green whereby it will hardly be observed among a bank of plants. The clutch is made of brass and the dog of tempered tool steel. The stand pipe or post 21 is made of galvanized iron and together with the brass clutch cannot corrode and impair the usefulness of the stand.

By easing or lifting the weight upon the platform 23, said platform can be revolved without moving the base of the stand.

Having now described my invention what I claim as new, is:—

In combination, an adjustable supporting means, a platform carried by the upper end of said support and provided with a vertically-disposed opening having the walls thereof grooved, a supporting member provided with a shank having opposing lugs, said member extending through said opening and supported by said lugs when a pair of the lugs engage the upper face of the platform, said member when shifted to aline the lugs with the grooves of said walls allowing of the vertical adjustment of the member.

In testimony whereof I affix my signature in the presence of two witnesses.

JACOB M. HAMM.

Witnesses:
MAX H. SROLOVITZ,
KARL H. BUTLER.